United States Patent
Martin et al.

(10) Patent No.: US 11,149,739 B1
(45) Date of Patent: Oct. 19, 2021

(54) ADJUSTABLE BEARING MOUNT FOR AIR-COOLED HEAT EXCHANGERS

(71) Applicant: Hudson Products Corporation, Ball Ground, GA (US)

(72) Inventors: Indian Martin, Tulsa, OK (US); Bailey Meadows, Broken Arrow, OK (US)

(73) Assignee: Hudson Products Corporation, Ball Ground, GA (US)

( * ) Notice: Subject to any disclaimer, the term of this patent is extended or adjusted under 35 U.S.C. 154(b) by 144 days.

(21) Appl. No.: 16/429,991

(22) Filed: Jun. 3, 2019

Related U.S. Application Data (60) Provisional application No. 62/679,303, filed on Jun. 1, 2018.

(51) Int. Cl.
*F04D 29/046* (2006.01)
*F16C 35/067* (2006.01)

(52) U.S. Cl.
CPC .......... *F04D 29/046* (2013.01); *F16C 35/067* (2013.01); *F05D 2240/50* (2013.01); *F16C 2360/46* (2013.01)

(58) Field of Classification Search
CPC .......... F03D 13/22; F03D 7/0204; F03D 9/25; F03D 13/25; B63B 35/44; B63B 39/03; F04D 29/646; F04D 29/622; F04D 29/046; F04D 29/626; F04D 29/056; F04D 29/0563; F05D 2240/50; F16C 23/00; F16C 2360/46; F16C 35/077; F16C 35/067
See application file for complete search history.

(56) References Cited

U.S. PATENT DOCUMENTS

| | | | | | |
|---|---|---|---|---|---|
| 1,698,328 | A | * | 1/1929 | Duffie | F04D 29/646 248/606 |
| 2,148,691 | A | * | 2/1939 | Griffin | F16B 37/00 384/260 |
| 2,621,850 | A | * | 12/1952 | Firth | F04D 29/626 415/142 |
| 2,994,568 | A | * | 8/1961 | Downs | F16C 23/00 384/519 |

(Continued)

OTHER PUBLICATIONS

Holman, "All You Need To Know About Take-Up Bearings", Dec. 28, 2017, https://www.heatbud.com/post/business-zone-all-you-need-to-know-about-take-up-bearings (Year: 2017).*

(Continued)

*Primary Examiner* — Courtney D Heinle
*Assistant Examiner* — Andrew Thanh Bui
(74) *Attorney, Agent, or Firm* — Cook Alex Ltd.; R. Blake Johnston (57) ABSTRACT

An air-cooled heat exchanger has a plenum, an engine, and a fan assembly driven by the engine and configured to move air through the plenum. The fan assembly has a fan, a fan shaft connected to the fan, and a fan shaft bearing assembly that supports the fan shaft. The fan shaft bearing assembly has a fan shaft bearing and a vertical adjustment mechanism that selectively controls the vertical position of the fan shaft bearing. The air-cooled heat exchanger may optionally include a horizontal adjustment mechanism that selectively controls the horizontal position of the fan shaft bearing.

16 Claims, 6 Drawing Sheets

(56) References Cited

U.S. PATENT DOCUMENTS

| | | | | |
|---|---|---|---|---|
| 3,773,285 | A | * 11/1973 | Morrill | F04D 29/646 |
| | | | | 248/603 |
| 5,899,321 | A | * 5/1999 | El-Ibiary | B65G 39/16 |
| | | | | 198/807 |
| 2013/0092352 | A1 | * 4/2013 | Martin | F28F 9/00 |
| | | | | 165/68 |

OTHER PUBLICATIONS

"Enclosed Conveyor Belt Tensioner", 2016, McMaster-Carr (Year: 2016).*

* cited by examiner

ADJUSTABLE BEARING MOUNT FOR AIR-COOLED HEAT EXCHANGERS

RELATED APPLICATIONS

This application claims the benefit of U.S. Provisional Patent Application Ser. No. 62/679,303 filed Jun. 1, 2018 and entitled, "Adjustable Bearing Mount for Air-Cooled Heat Exchangers," the entire disclosure of which is herein incorporated by reference.

FIELD OF THE INVENTION

The present invention generally relates to air-cooled heat exchangers, and more particularly, but not by way of limitation, to an improved system for positioning shaft bearings used in air-cooled heat exchangers.

BACKGROUND OF THE INVENTION

Air-cooled heat exchangers are used in a wide variety of industrial applications. A process fluid, either a gas or a liquid, is passed through a series of cooling tubes while air is mechanically passed over the exterior of the cooling tubes. The air absorbs heat from the cooling tubes, thereby lowering the temperature of the fluid within the tubes. The cooling tubes may include lateral or axial fins to aid in heat transfer.

In a typical air-cooled heat exchanger, a large fan is used to force or draw air at ambient conditions through a plenum fabricated from a series of panels supported by an underlying frame assembly. The plenum directs the ambient air through the cooling tube assembly, which includes header boxes located on opposite sides of the plenum. The header boxes include inlets and outlets to permit the flow of the process fluid through the heat exchanger. In some applications, a series of adjustable louvers are positioned downstream and/or upstream from the cooling tubes to control the flow of air across the cooling tube assembly.

The fan is typically driven by an external engine. A fan shaft extends from the fan through the cooling tubes assembly and plenum to a drive assembly on the exterior of the air-cooled heat exchanger proximate the engine. As noted in the PRIOR ART drawing in FIG. 1, the fan shaft 200 is supported by a fan shaft bearing 202 that is fixed in position on the frame 204 of the air-cooled heat exchanger 206. One or more additional bearings may be fixed to frame members inside the air-cooled heat exchanger 206. The prior art fan shaft bearing 202 is a pillow block bearing that has mounting holes to the frame 204 that run perpendicular to the fan shaft 200.

Figure 1:
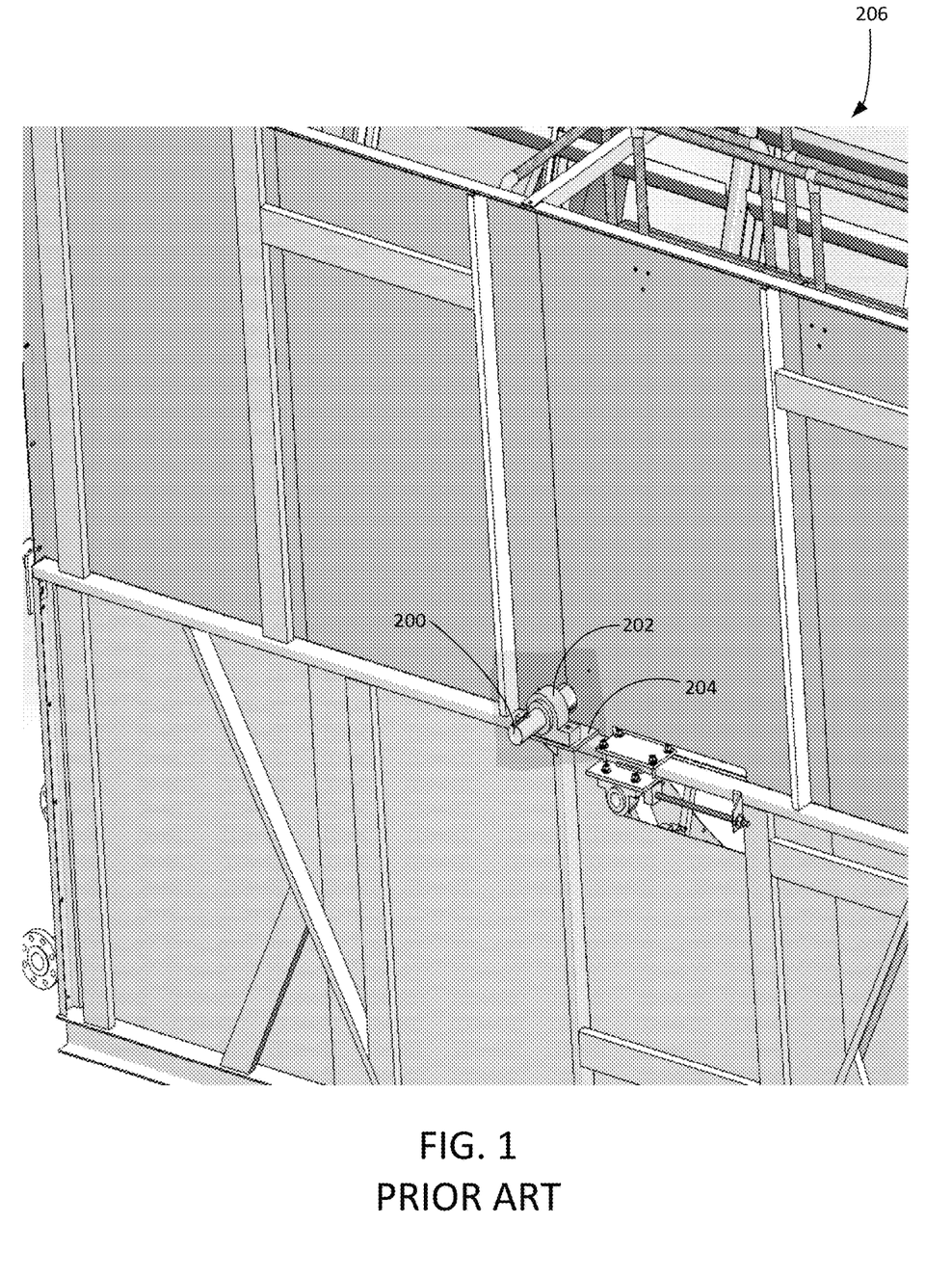
FIG. 1 provides a side view of a PRIOR ART air-cooled heat exchanger and fan shaft bearing.

Although widely adopted, the prior art use of fixed fan shaft bearings presents several problems. In some cases, it is difficult to precisely align the fan shaft bearings 202 along the fan shaft 200, which may accelerate wear on the fan shaft bearings 202 or cause shaft runout. Additionally, as the fan shaft 200 and fan shaft bearings 202 wear over time, it is difficult to realign the fan shaft 200 with the fixed-position, prior art fan shaft bearings 202. The presently preferred embodiments are directed to these and other deficiencies in the prior art.

SUMMARY OF THE INVENTION

In one embodiment, the present invention includes an air-cooled heat exchanger that has a plenum, an engine, and a fan assembly driven by the engine and configured to move air through the plenum. The fan assembly has a fan, a fan shaft connected to the fan, and a fan shaft bearing assembly that supports the fan shaft. The fan shaft bearing assembly has a fan shaft bearing and a vertical adjustment mechanism that selectively controls the vertical position of the fan shaft bearing. The air-cooled heat exchanger may optionally include a horizontal adjustment mechanism that selectively controls the horizontal position of the fan shaft bearing.

In another embodiment, the present invention includes an air-cooled heat exchanger that has a plenum, an engine, and a fan assembly driven by the engine and configured to move air through the plenum. The fan assembly has a fan, a fan shaft connected to the fan, and a fan shaft bearing assembly that supports the fan shaft. The fan shaft bearing assembly includes an outer mounting plate, a carriage block configured for attachment to the outer mounting plate in multiple vertical positions, and a fan shaft bearing secured to the carriage block. The fan shaft passes through the fan shaft bearing. The fan shaft bearing assembly also includes a vertical adjustment mechanism configured to adjust the vertical position of the carriage block within the outer mounting plate.

In yet another embodiment, the present invention includes an air-cooled heat exchanger that has a plenum, an engine, and a fan assembly driven by the engine and configured to move air through the plenum. The fan assembly includes a fan, a fan shaft connected to the fan, and a fan shaft bearing assembly that supports the fan shaft. The fan shaft bearing assembly has an outer mounting plate, a carriage block configured for attachment to the outer mounting plate, and a fan shaft bearing secured to the carriage block. The fan shaft passes through the fan shaft bearing. The fan shaft bearing assembly further comprises a horizontal adjustment mechanism configured to adjust the horizontal position of the fan shaft within the carriage block.

WRITTEN DESCRIPTION

Figure 2:
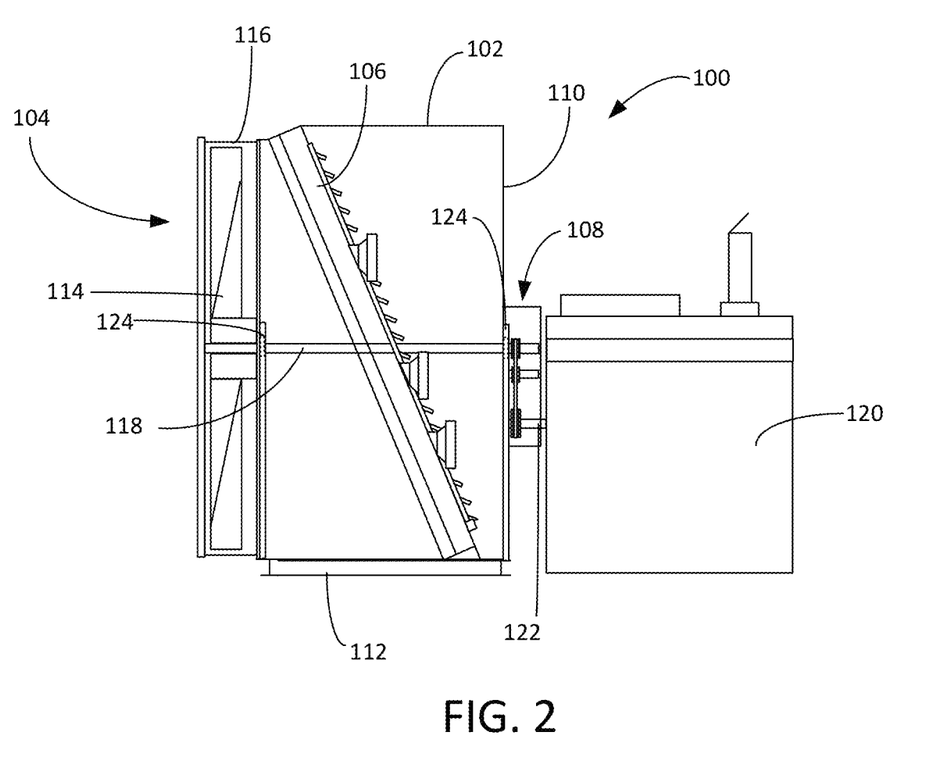
FIG. 2 is a side view of an air-cooled heat exchanger with an adjustable fan shaft bearing mount, constructed in accordance with an exemplary embodiment.

Referring to FIG. 2, shown therein is a side view of an air-cooled heat exchanger 100 constructed in accordance with an exemplary embodiment. The air-cooled heat exchanger 100 generally includes a plenum 102, a fan assembly 104, cooling tubes assembly 106 and a drive assembly 108. As depicted, the air-cooled heat exchanger 100 is configured as a forced-draft unit in which ambient air is forced by the fan assembly 104 into the front of the plenum 102, through the cooling tubes assembly 106, and out the top of the plenum 102. In alternate embodiments, the air-cooled heat exchanger 100 is an induced draft air design in which air is drawn across the cooling tubes assembly 106.

The plenum 102 includes a series of panels 110 that are attached to a frame assembly 112. The panels 110 and frame assembly 112 are preferably constructed from metal or other durable materials. The frame assembly 112 may include a base constructed from "I-beams" and a structural skeleton that includes a plurality of trusses, struts and beams (not separately designated). Some of the panels 110 have been removed to reveal the internal components of the cooling tubes assembly 106, fan assembly 104 and drive assembly 108.

The fan assembly 104 includes a fan 114 and a fan shroud 116 that is connected to the plenum 102. A fan shaft 118 connects the fan 114 to the drive assembly 108. The drive assembly 108 generally reduces the rotational speed and increases the torque produced by an engine 120. A drive shaft 122 transfers the torque from the engine 120 to the drive assembly 108. Although the drive assembly 108 is depicted in an external position between the plenum 102 and the engine 120, it will be appreciated that in some embodiments, the drive assembly is positioned inside the plenum proximate to the fan assembly 104. In those alternate embodiments, the length of the fan shaft 118 will be shorter, while the length of the drive shaft 122 will be longer.

The fan shaft 118 is supported by one or more fan shaft bearing assemblies 124. In FIG. 2, one fan shaft bearing assembly 124 is depicted on the outside of the plenum 102, while another is depicted inside the plenum 102 proximate the fan assembly 104. It will be appreciated, however, that in some applications there may be a single fan shaft bearing assembly 124. In other embodiments, there may be more than two fan shaft bearing assemblies 124.

Figure 3:
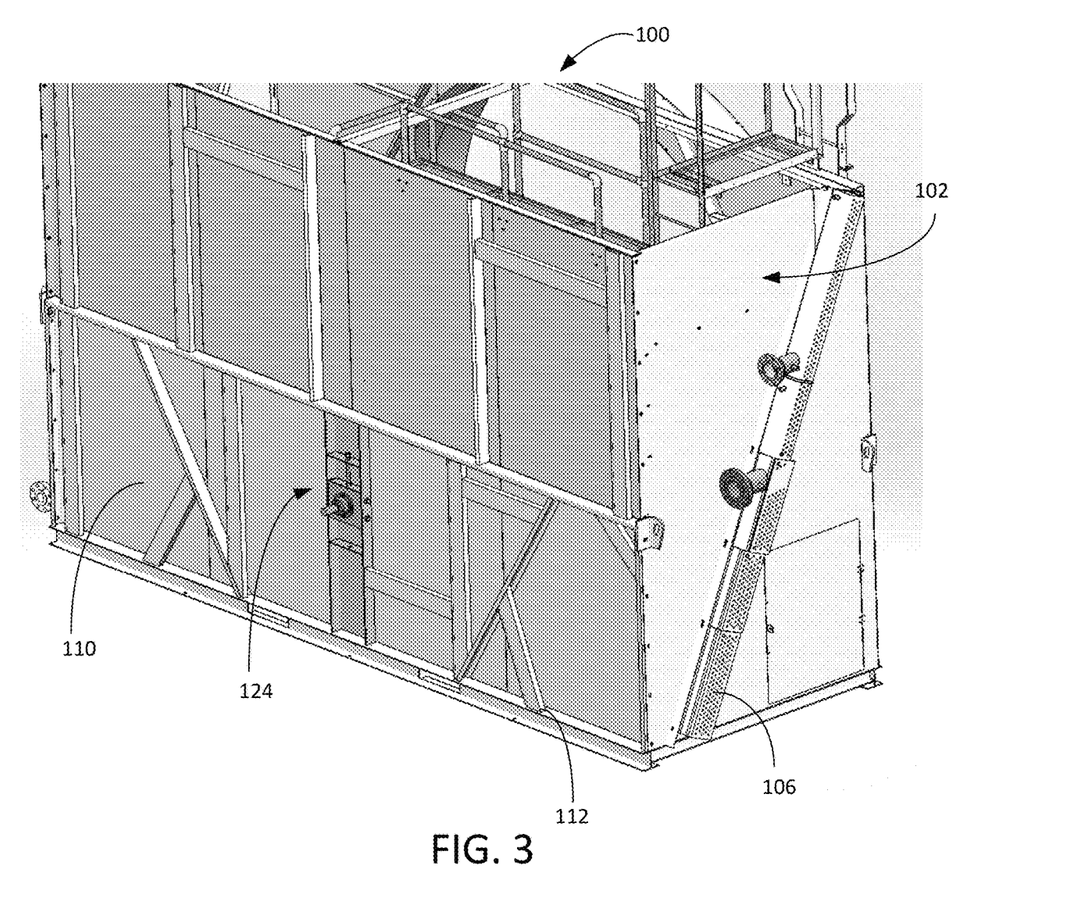
FIG. 3 is a perspective view of an air-cooled heat exchanger constructed in accordance with an exemplary embodiment.
Figure 4:
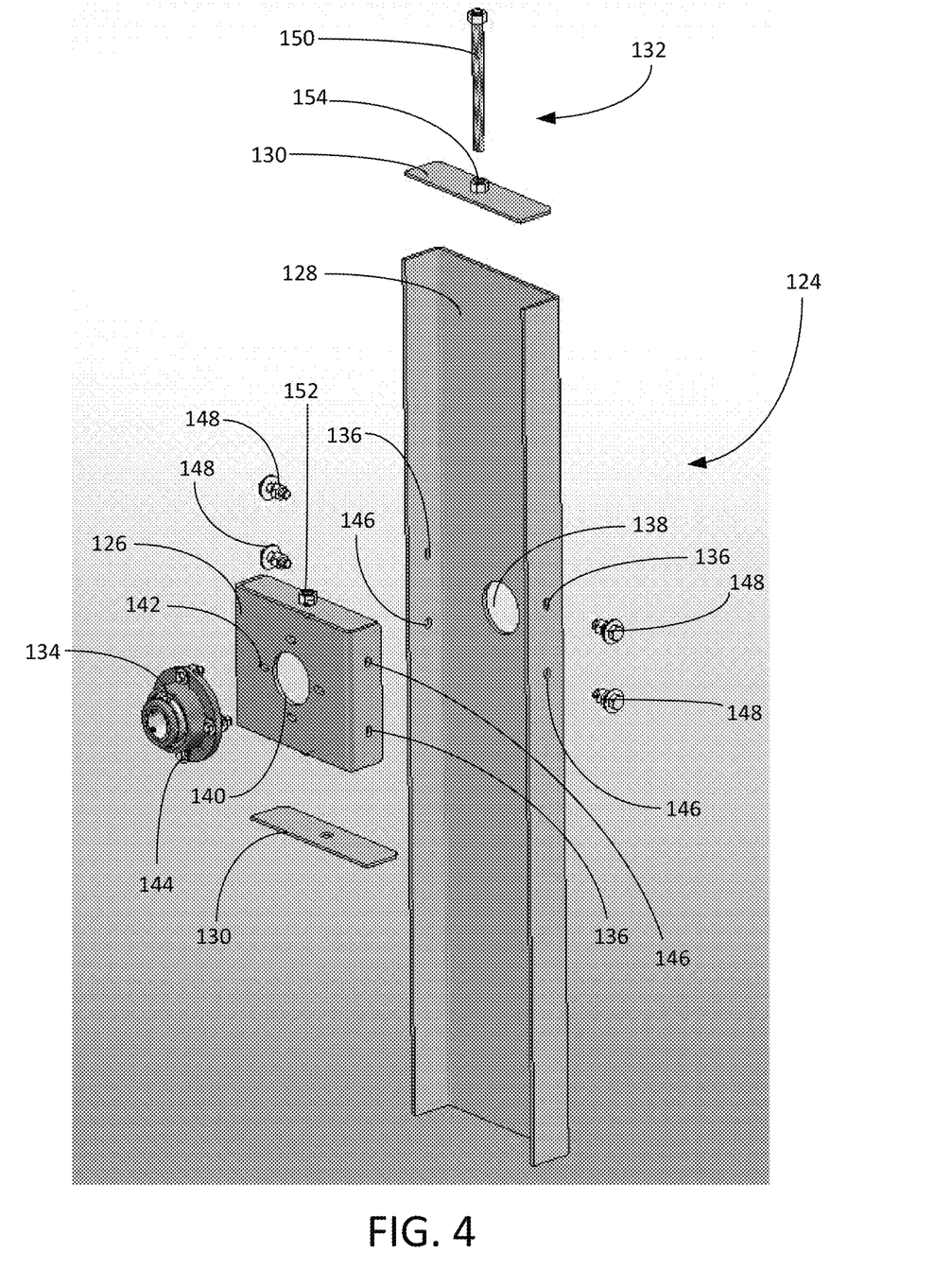
FIG. 4 is a perspective, exploded view of the adjustable fan shaft bearing mount from the air-cooled heat exchanger of FIG. 3.
Figure 5:
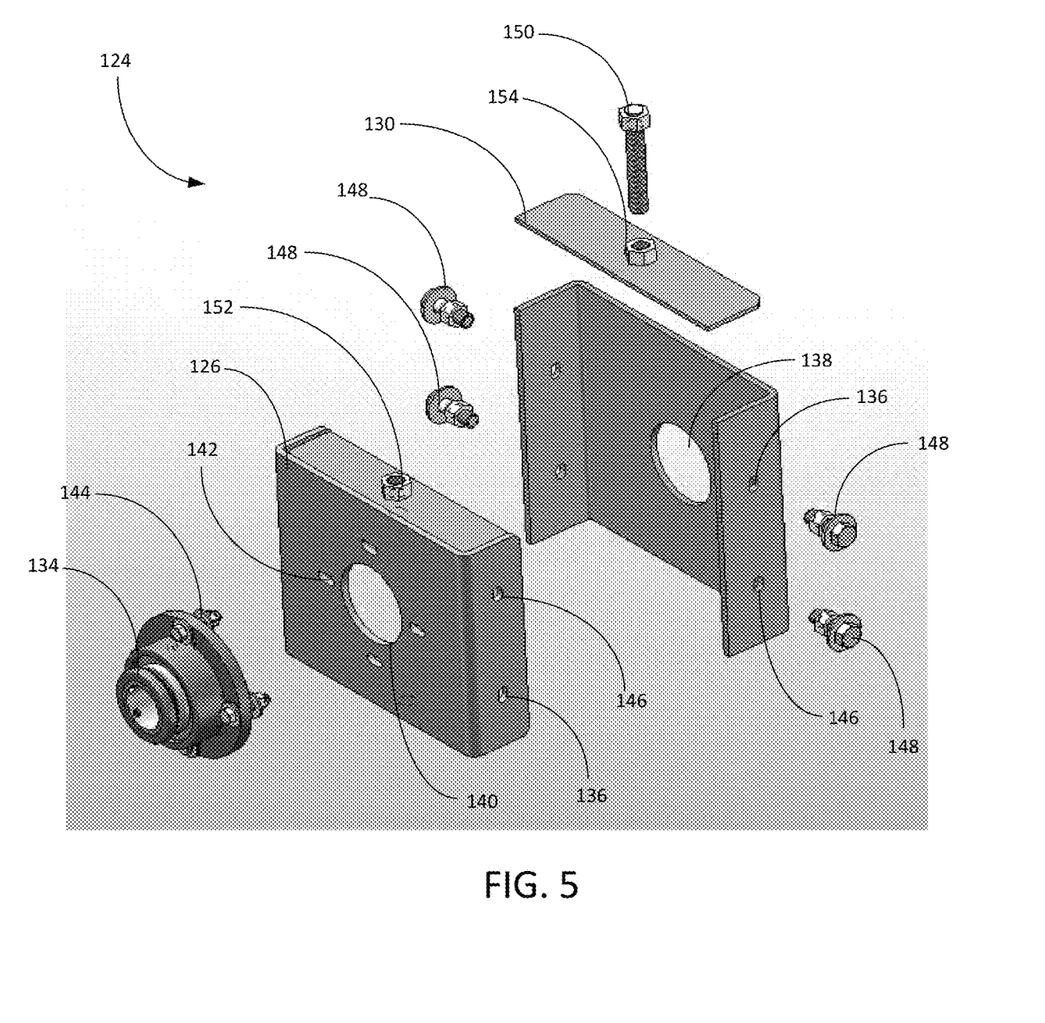
FIG. 5 is a close-up, perspective, exploded view of a portion of the fan shaft bearing mount of FIG. 4.
Figure 6:
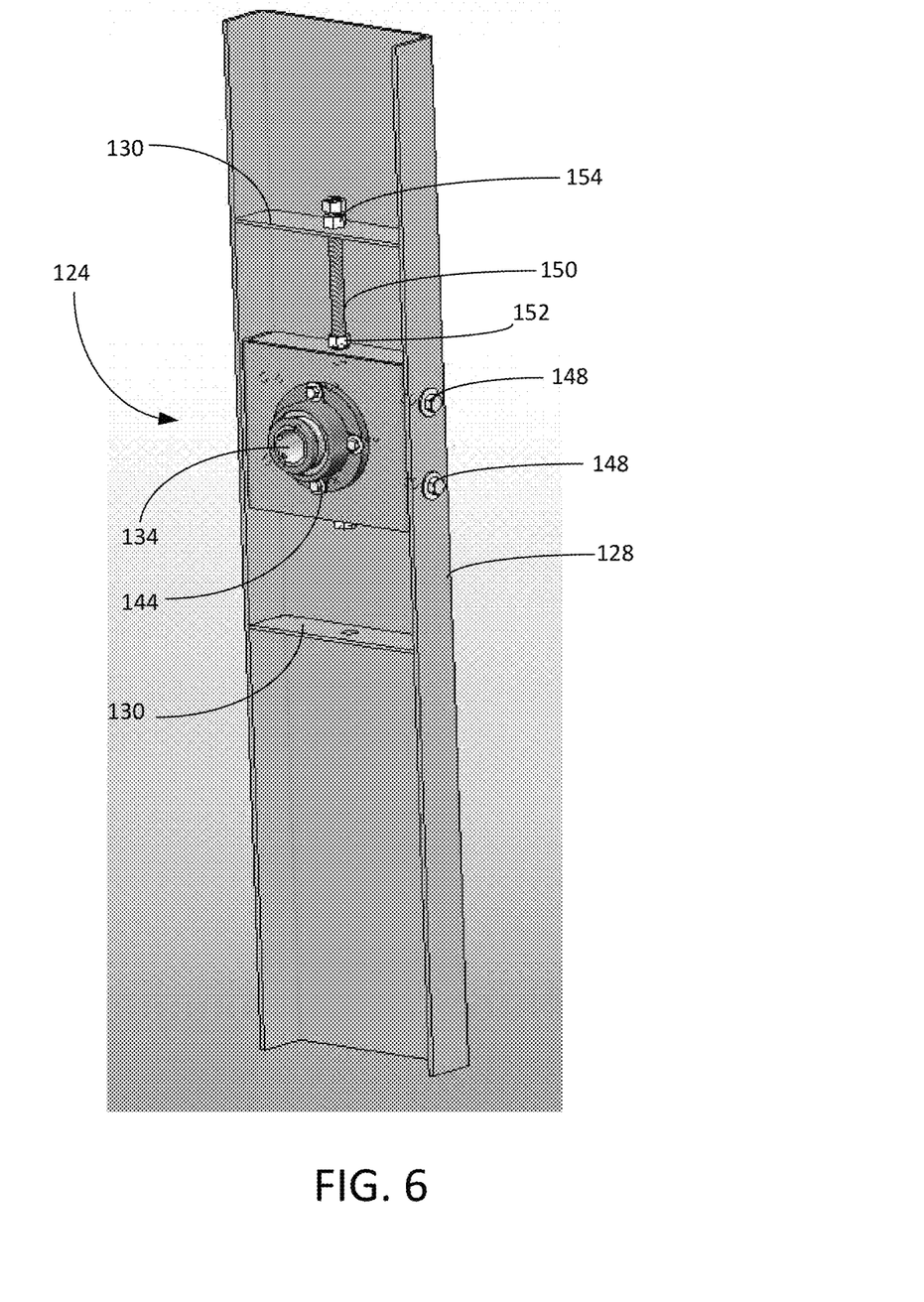
FIG. 6 is a perspective, assembled view of the adjustable fan shaft bearing mount of FIG. 4.

Turning to FIG. 3, shown therein is a rear perspective view of the air-cooled heat exchanger 100 with the fan shaft bearing assembly 124. FIGS. 4-6 provide close-up views of the various components within the fan shaft bearing assembly 124. In exemplary embodiments, the fan shaft bearing assembly 124 includes a carriage block 126 captured within an outer mounting plate 128. The fan shaft bearing assembly 124 may also include one or more reinforcement plates 130 fixed in position within the outer mounting plate 128. The reinforcement plates 130 are sized and configured to be welded or otherwise secured in a fixed position inside the open channel of the outer mounting plate 128. The fan shaft bearing assembly 124 also includes a vertical adjustment mechanism 132 to raise or lower the carriage block 126 within the outer mounting plate 128. A fan shaft bearing 134 is secured to the carriage block 126.

As best illustrated in FIGS. 4-6, the outer mounting plate 128 is constructed from C-channel tubing and includes a pair of vertical slots 136 and a pair of carriage fastener holes 146 on opposing sides of the outer mounting plate 128. The outer mounting plate 128 also includes a shaft aperture 138 through the back side of the outer mounting plate 128. The shaft aperture 138 is larger than the outer diameter of the fan shaft 118 to permit the adjustment of the fan shaft 118 within the outer mounting plate 128. The carriage block 126 includes a bearing aperture 140 and a plurality of horizontal slots 142 on the front face of the carriage block 126. The bearing aperture 140 is sized to allow the fan shaft 118 to pass through the carriage block 126 into the fan shaft bearing 134.

The fan shaft bearing 134 includes a plurality of bearing fasteners 144 that are configured to be received by the horizontal slots 142 in the carriage block 126. The bearing fasteners 144 and horizontal slots 142 are respectively sized to permit the fan shaft bearing 134 to be shifted horizontally with respect to the carriage block 126 when the bearing fasteners 144 are not tightened. When tightened, the bearing fasteners 144 lock the fan shaft bearing 134 into a desired horizontal position on the carriage block 126.

The carriage block 126 includes a pair of vertical slots 136 and a pair of carriage fastener holes 146. The vertical slots 136 on the carriage block 126 are configured for alignment with the carriage fastener holes 146 in the outer mounting plate 128. Similarly, the carriage fasteners holes 146 on the carriage block 126 are configured for alignment with the vertical slots 136 in the outer mounting plate 128. Carriage fasteners 148 extend through the vertical slots 136 and outer fastener holes 146 in the outer mounting plate 128 to the corresponding vertical slots 136 and outer fastener holes 146 in the carriage block 126. The carriage fasteners 148 and vertical slots 136 are respectively sized to permit the carriage block 126 to shift vertically in the outer mounting plate 128 when the carriage fasteners 148 are not tightened. When tightened, the carriage fasteners 148 lock the carriage block 126 into a desired vertical position in the outer mounting plate 128.

The vertical adjustment mechanism 132 is configured to precisely adjust the vertical position of the carriage block 126 in the outer mounting plate 128 under the weight of the fan shaft 118. In exemplary embodiments, the vertical adjustment mechanism 132 includes a threaded rod 150 that extends from an unthreaded connector 152 on the carriage block 126 through a threaded receiver 154 on one of the reinforcement plates 130. The unthreaded connector 152 prevents the threaded rod 150 from being removed from the carriage block 126, but permits the threaded rod 150 to rotate freely within the unthreaded connector 152 while lifting or lowering the carriage block 126. As the threaded rod 150 turns through the threaded receiver 154, the threaded engagement lifts or lowers the carriage block 126 within the outer mounting plate 128. It will be appreciated that the carriage fasteners 148 must be loosened prior to using the vertical adjustment mechanism 132 to raise or lower the carriage block 126.

Thus, unlike the prior art use of fixed pillow block bearings that do not permit adjustment of the position of the fan shaft 118, the fan shaft bearing assembly 124 permits precise vertical and horizontal adjustment of the fan shaft bearing 134 and fan shaft 118. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein. It will be appreciated by those skilled in the art that the teachings of the present invention can be applied to other systems without departing from the scope and spirit of the present invention.

What is claimed is:

1. An air-cooled heat exchanger comprising:
   a plenum;
   an engine; and
   a fan assembly driven by the engine and configured to move air through the plenum,
      wherein the fan assembly comprises:
      a fan;
      a fan shaft connected to the fan; and a fan shaft bearing assembly that supports the fan shaft, wherein the fan shaft bearing assembly comprises:
- a fan shaft bearing;
- a vertical adjustment mechanism that selectively controls the vertical position of the fan shaft bearing; and
- a horizontal adjustment mechanism that selectively controls the horizontal position of the fan shaft bearing.

2. An air-cooled heat exchanger comprising:
a plenum;
an engine; and
a fan assembly driven by the engine and configured to move air through the plenum, wherein the fan assembly comprises:
- a fan;
- a fan shaft connected to the fan; and
- a fan shaft bearing assembly that supports the fan shaft, wherein the fan shaft bearing assembly comprises:
  - an outer mounting plate;
  - a carriage block configured for attachment to the outer mounting plate in multiple vertical positions;
  - a fan shaft bearing secured to the carriage block, wherein the fan shaft passes through the fan shaft bearing;
  - a vertical adjustment mechanism configured to adjust the vertical position of the carriage block within the outer mounting plate; and
  - wherein the outer mounting plate comprises a plurality of vertical slots, and wherein the carriage block is secured to the outer mounting plate with a plurality of carriage fasteners that each extend through a corresponding one of the plurality of vertical slots.

3. The air-cooled heat exchanger of claim 2, wherein the vertical adjustment mechanism comprises:
- a reinforcement plate stationarily attached to the outer mounting plate at a distance from the carriage block; and
- a threaded rod that extends from the reinforcement plate to the carriage block, wherein the rotation of the threaded rod adjusts the distance between the reinforcement plate and the carriage block.

4. The air-cooled heat exchanger of claim 3, wherein the vertical adjustment mechanism further comprises:
- an unthreaded connector attached to the carriage block;
- a threaded connector attached to the reinforcement plate; and
- wherein the threaded rod extends through the threaded connector to the unthreaded connector.

5. The air-cooled heat exchanger of claim 2, wherein each of the carriage fasteners has a diameter that is less than the length of the corresponding vertical slot in the outer mounting bracket.

6. The air-cooled heat exchanger of claim 2, wherein the fan shaft bearing assembly further comprises a horizontal adjustment mechanism.

7. The air-cooled heat exchanger of claim 6, wherein the fan shaft bearing includes a plurality of bearing fasteners configured to secure the fan shaft bearing to the carriage block.

8. The air-cooled heat exchanger of claim 7, wherein the carriage block comprises:
- a bearing aperture sized to receive the fan shaft bearing; and
- a plurality of horizontal slots each configured to receive a corresponding one of the bearing fasteners, wherein each of the plurality of horizontal slots has a width that is wider than the corresponding bearing fastener to permit the bearing fastener to be shifted horizontally within the horizontal slot.

9. An air-cooled heat exchanger comprising:
a plenum;
an engine; and
a fan assembly driven by the engine and configured to move air through the plenum, wherein the fan assembly comprises:
- a fan;
- a fan shaft connected to the fan; and
- a fan shaft bearing assembly that supports the fan shaft, wherein the fan shaft bearing assembly comprises:
  - an outer mounting plate;
  - a carriage block configured for attachment to the outer mounting plate;
  - a fan shaft bearing secured to the carriage block, wherein the fan shaft passes through the fan shaft bearing; and
  - a horizontal adjustment mechanism configured to adjust the horizontal position of the fan shaft within the carriage block.

10. The air-cooled heat exchanger of claim 9, wherein the fan shaft bearing includes a plurality of bearing fasteners configured to secure the fan shaft bearing to the carriage block.

11. The air-cooled heat exchanger of claim 10, wherein the carriage block comprises:
- a bearing aperture sized to receive the fan shaft bearing; and
- a plurality of horizontal slots each configured to receive a corresponding one of the bearing fasteners, wherein each of the plurality of horizontal slots has a width that is wider than the corresponding bearing fastener to permit the bearing fastener to be shifted horizontally within the horizontal slot.

12. The air-cooled heat exchanger of claim 9, wherein the fan shaft bearing assembly further comprises a vertical adjustment mechanism.

13. The air-cooled heat exchanger of claim 12, wherein the vertical adjustment mechanism comprises:
- a reinforcement plate stationarily attached to the outer mounting plate at a distance from the carriage block; and
- a threaded rod that extends from the reinforcement plate to the carriage block, wherein the rotation of the threaded rod adjusts the distance between the reinforcement plate and the carriage block.

14. The air-cooled heat exchanger of claim 13, wherein the vertical adjustment mechanism further comprises:
- an unthreaded connector attached to the carriage block;
- a threaded connector attached to the reinforcement plate; and
- wherein the threaded rod extends through the threaded connector to the unthreaded connector.

15. The air-cooled heat exchanger of claim 14, wherein the outer mounting plate comprises a plurality of vertical slots, and wherein the carriage block is secured to the outer mounting plate with a plurality of carriage fasteners that each extend through a corresponding one of the plurality of vertical slots.

16. The air-cooled heat exchanger of claim 15, wherein each of the carriage fasteners has a diameter that is less than the length of the corresponding vertical slot in the outer mounting bracket.

\* \* \* \* \*